United States Patent
Blair et al.

(10) Patent No.: US 7,158,765 B2
(45) Date of Patent: Jan. 2, 2007

(54) METHOD AND APPARATUS FOR CONTROLLING POWER OF A TRANSMITTED SIGNAL

(75) Inventors: John L. Blair, Atlanta, GA (US); Ming-Ju Ho, Fulton, GA (US); Dukhyun Kim, Cobb, GA (US); Michael S. Rawles, Morrisville, NC (US)

(73) Assignee: Agere Systems, Inc., Allentown, PA (US)

( * ) Notice: Subject to any disclaimer, the term of this patent is extended or adjusted under 35 U.S.C. 154(b) by 644 days.

(21) Appl. No.: 09/917,870

(22) Filed: Jul. 31, 2001

(65) Prior Publication Data

US 2003/0027535 A1   Feb. 6, 2003

(51) Int. Cl.
*H01Q 11/12* (2006.01)
*H04B 7/00* (2006.01)
(52) U.S. Cl. .................................. 455/127.1; 455/522
(58) Field of Classification Search ................ 455/522, 455/126, 127.1, 127.2, 127.5
See application file for complete search history.

(56) References Cited

U.S. PATENT DOCUMENTS

| 5,170,495 A | * | 12/1992 | McNicol et al. ............. 455/116 |
| 6,434,135 B1 | * | 8/2002 | Ozluturk et al. ............ 370/342 |
| 6,529,925 B1 | * | 3/2003 | Schenk ........................ 708/300 |
| 6,556,629 B1 | * | 4/2003 | Evans ......................... 375/297 |
| 6,718,165 B1 | * | 4/2004 | Ha ........................... 455/234.2 |
| 6,765,899 B1 | * | 7/2004 | Lundh et al. ............... 370/342 |

OTHER PUBLICATIONS

Enright, R. et al., "OFDM Modem with Peak-to-Mean Envelope Power Ratio Reduction using Adaptive Clipping," HF Radio Systems and Techniques, Jul. 7-10, 1997, Conference Publication No. 411, IEE, 1997.

* cited by examiner

*Primary Examiner*—William J. Deane, Jr.

(57) ABSTRACT

In the method and apparatus of controlling power of a transmitted communication signal, a communication signal is amplified and transmitted. At least one parameter on the transmitted signal is received, and a measure of interference with the transmitted signal is determined based on the received parameter. An average power level of the communication signal is increased by clipping the communication signal prior to amplification by an amount based on the determined measure.

14 Claims, 2 Drawing Sheets

*Fig.1*
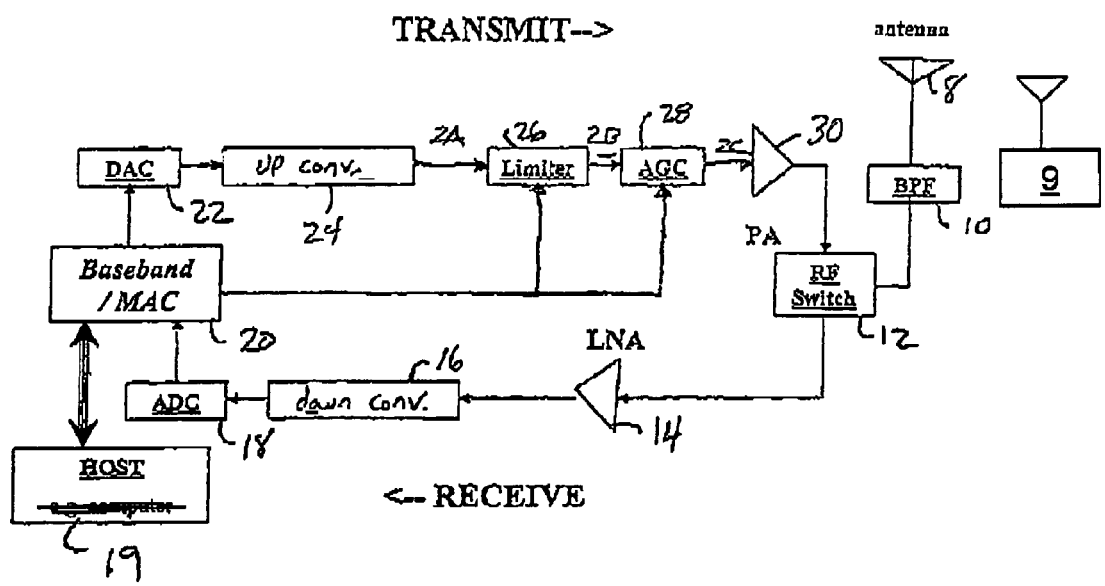
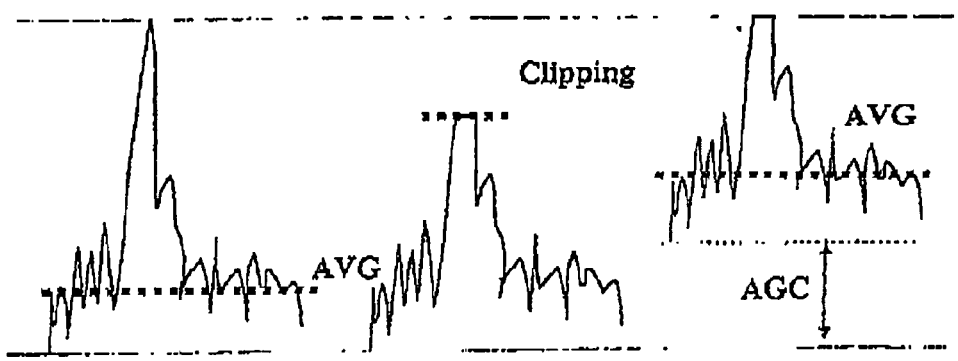
Fig. 2A     Fig. 2B     Fig. 2C

METHOD AND APPARATUS FOR CONTROLLING POWER OF A TRANSMITTED SIGNAL

BACKGROUND OF THE INVENTION

1. Field of the Invention

The present invention relates to the field of telecommunications, and more particularly, a method and apparatus for controlling the power of a transmitted signal.

2. Description of Related Art

Orthogonal Frequency Division Multiplexing (OFDM) is a special form of multi-carrier modulation having inherent robustness against multipath effect. For example, IEEE 802.11a specifies the Physical Layer Entry for an OFDM system that provides a wireless Local Area Network (LAN) with data payload communication capabilities from 6 to 54 Mbits/sec in the Unlicensed National Information Infrastructure (U-NII) frequency band. The system uses 52 sub-carriers which are independently modulated by using Binary Phase Shift Keying (BPSK), Quadrature Phase Shift Keying (QPSK), 16-Quadrature Amplitude Modulation (16-QAM) or 64-Quadrature Amplitude Modulation (64-QAM) associated with different coding rate for different data speed.

A major challenge for an OFDM-based communication system is the inherent high crest factor (peak-to-average ratio) of multi-carrier systems. Considerable output power back-off from the power amplifier (PA) saturation region will be needed to avoid distortion and spectral regrowth. The back-off for the power amplifier, however, reduces its efficiency. Because the peak transmitted power is usually constrained by regulatory limits, a large back-off of the power amplifier design to deal with the high crest factor has the effect of significantly reducing the average transmit power. The low average transmit power introduces several problems such as reducing radio coverage and making the transmitted signal more susceptible to interference.

So far, several crest factor reduction techniques have been proposed such as Reed-Muller codes, Golay sequences, subsets of block coding that avoid transmitting codewords with a large crest factor, and selective sub-carrier mapping to reduce the crest factor. However, as the number of sub-carriers increases, the coding rate slows and the coding process becomes more complicated (e.g. extensive computation, search, look-up tables). Unlike cellular/PCS systems that can afford costly power amplifiers, the power amplifier used in a wireless LAN needs to be simple and cheap. Clipping the OFDM signal is another way to reduce the crest factor. Clipping can be described as limiting the peak amplitude of an OFDM signal to the power amplifier input so that the undesirable effect of the amplifier non-linearity problem can be controlled. However, inadequate clipping introduces excessive out-of-band distortion.

SUMMARY OF THE INVENTION

In the method and apparatus according to the present invention, interference with the transmitted signal is monitored. When long term interference is encountered, the average power of the transmitted signal is increased by a first amount. And, when short term interference is encountered, the average power of the transmitted signal is increased by a second amount greater than the first amount. Increasing the average signal power in this manner compensates for the determined interference.

The average signal power is increased without causing the power amplifier to enter the saturation region. Consequently distortion and spectral regrowth are avoided. To increase the average power of the transmitted signal, the signal for transmission is clipped to remove undesirably high peaks, and then the gain of the signal is increased. The clipping level and gain are adjusted based on the amount of determined interference. Accordingly, the clipping level is increased by, for example, the first amount when long term interference is determined, and increased, for example, by the second amount when short term interference is determined.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein:

FIG. 1 illustrates a block diagram of an apparatus employing the method of the present invention;

FIG. 2 illustrates waveforms output by elements in the block diagram of FIG. 1.

DETAILED DESCRIPTION OF THE PREFERRED EMBODIMENTS

Figure 3:
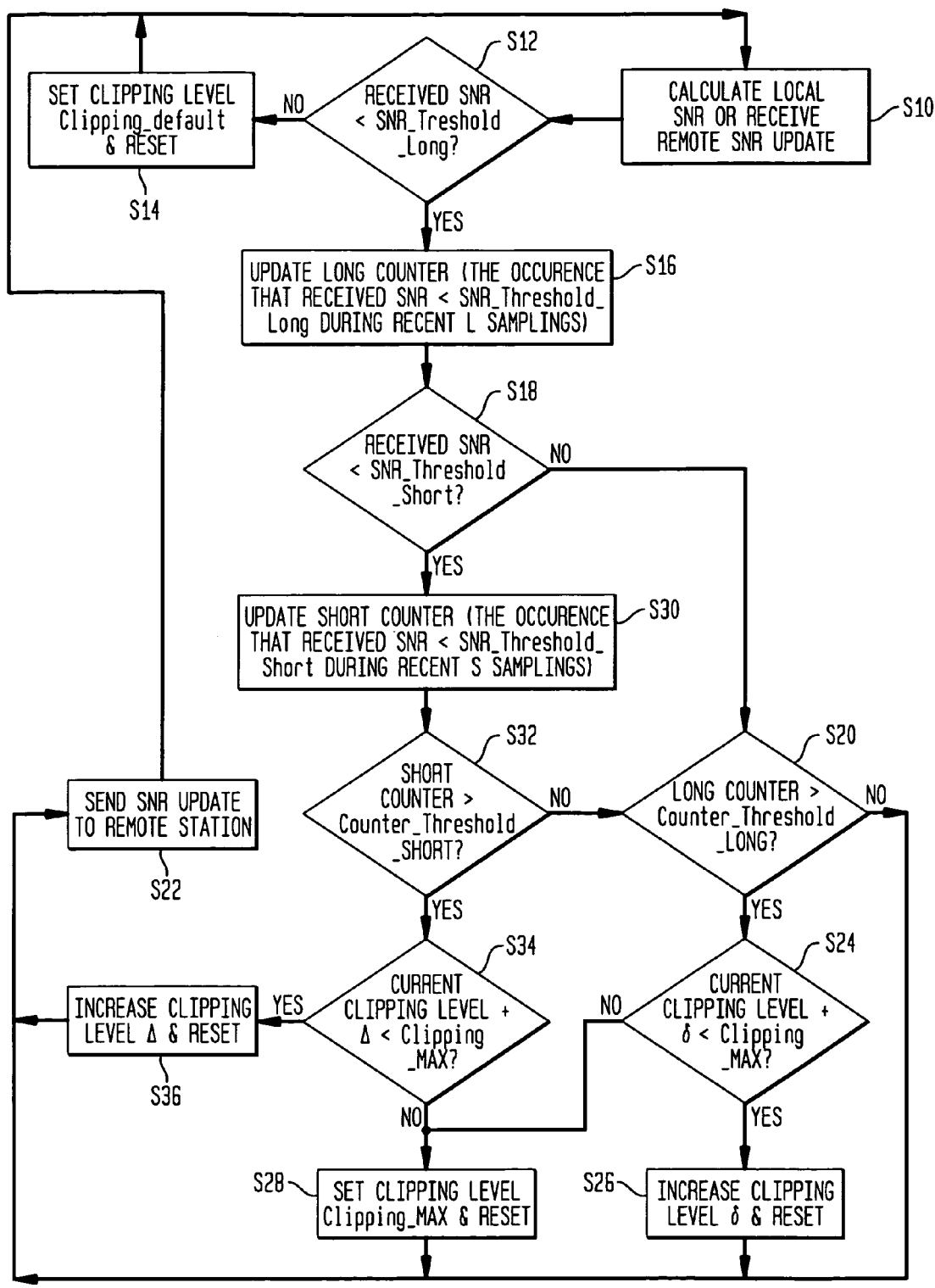
FIG. 3 illustrates a flowchart of an embodiment of the method according to the present invention.

FIG. 1 illustrates a block diagram of a communication apparatus such as a wireless Local Area Network (LAN) card or base station employing the method of the present invention. While the method of the present invention will be described as implemented by a wireless LAN, the method is not limited to this implementation. For example, the method could be implemented by a cellular communication system.

As shown in FIG. 1, an antenna 8 receives and transmits signals to and from another transmission source 9 via a band-pass filter 10 and a duplexer 12. The duplexer 12 supplies the received signals to a low-noise amplifier 14. The amplifier 14 amplifies the signals and supplies them to a down converter 16, which down converts the radio frequency signal from the amplifier 14 to an intermediate frequency. An analog-to-digital converter (ADC) 18 converts the analog output of the down converter 16 to digital. A baseband /medium access controller (hereinafter "controller") 20 receives the output of the ADC 18. The controller 20 transfers received signals to a host 19 (e.g., a computer). Based on the signals received from the ADC 18, the controller 20 controls a limiter 26 and an automatic gain control (AGC) 28 according to the method of the present invention as described in detail below with respect to FIGS. 2 and 3.

Signals supplied from the host 19 to the controller 20 for transmission are supplied to a digital-to-analog converter (DAC) 22. The digital output of the DAC 22 is received by an up converter 24, which converts the received analog signals from an intermediate frequency to radio frequency. The limiter 26 clips the signals received from the up converter 26 based on control signals from the controller 20, and the AGC 28 gain controls the output of the limiter 26 based on control signals from the controller 20. A power amplifier 30 amplifies the output of the AGC 28, and supplies the result to the duplexer 12. The duplexer 12 passes the signal from the power amplifier 30 to the antenna 8 via the BPF 10.

FIG. 2A illustrates the output of the up converter 24. Because of the high peak-to-average ratio of this signal, an increase in the gain of the signal will cause the power amplifier 30 to enter the saturation region, and distortion and spectral regrowth will result. FIG. 2B shows the limiter 26 clipping the output of the up converter at a clipping level set by the controller 20. Having clipped the peak of the signal, the gain of the signal can be increased by the AGC 28 as shown in FIG. 2C such that the average power of the signal is increased without causing distortion and spectral regrowth.

The method by which the controller 20 controls the limiter 26 and the AGC 28 will now be described in detail with respect to FIG. 3. FIG. 3 illustrates a flow chart of the embodiment of the present invention employed by the controller 20. As shown, in step S10, the controller 20 receives signals via the antenna 8, the BPF 10, the duplexer 12, the amplifier 14, the down converter 16 and the ADC 18 from the other transmission source 9 such as a remote station (not shown). The signals either include a measurement of the signal-to-noise ratio (SNR) made by the other transmission source 9 or provide a signal strength measurement of the signal transmitted by the apparatus of FIG. 1 as measured by the transmission source. Using the signal strength measurement, the controller 20 calculates the SNR in the well-known manner.

Next in step S12, the controller 20 compares the received or calculated SNR to a long threshold. If in step S12 the controller 20 determines that the received or calculated SNR (hereinafter "the SNR") is not less than the long threshold, then in step S14, the controller 20 sets the clipping level of the limiter 26 and the gain of the AGC 28 to predetermined levels. Also, in step S14 the long and short counters, discussed in detail below, are reset. However, if the controller 20 determines the SNR is less than the long threshold, then the controller 20 determines that the possibility of long term interference exists (hence the name long threshold) and in step S16 the controller 20 increments a long counter.

Subsequent to step S16, the controller 20 determines if the SNR is less than a short threshold in step S18. If the controller 20 determines that the SNR is not less than the short threshold, then in step S20, the controller 20 determines if the long counter exceeds a long count threshold. If not, then in step S22 the controller 20 sends the SNR calculated in step S10 to the remote station and processing returns to step S10.

In step S20, if the long counter does exceed the long count threshold, then the controller 20 determines that long term interference (e.g., a more permanent change in the environment affecting the SNR) exists. In step S24, the controller 20 determines if the current clipping level plus a first predetermined amount (e.g., 0.1 to 0.5 dB) is less than a maximum clipping level. If so, then in step S26, the controller 20 increments the clipping level of the limiter 26 by the first predetermined amount, increases the gain of the AGC 28, and resets the long and short counters. In a preferred embodiment, the gain of the AGC 28 is increased by the same first predetermined amount, but it will be appreciated from this disclosure that the present invention is not limited to increasing the gain in this manner. After step S26, processing proceeds to step S22.

In step S24, if the current clipping level plus the first predetermined amount is not less than the clipping maximum, then in step S28, the clipping level of the limiter 26 is set at the clipping maximum, and the gain of the AGC 28 is increased by the same amount required to increase the current clipping level to the clipping maximum; however, the present invention is not limited to affecting gain of the AGC 28 in this one-for-one manner. Also, in step S28, the long and short counters are reset. Processing then proceeds to step S22.

Returning to step S18, if the SNR is less than the short threshold, then in step S30 the controller 20 determines that the possibility of short term interference exists and increments a short counter. In subsequent step S32, the controller 20 determines if the short counter exceeds a short count threshold. If the short counter does not exceed the short count threshold, then processing proceeds to step S20. However, if the short count exceeds the short count threshold, then the controller 20 determines that short term interference (e.g., a transmission by a different transmission source) exists. In step S34, the controller 20 determines if the current clipping level plus a second predetermined amount (e.g., 1 to 3 dB), greater than the first predetermined amount, is less than the maximum clipping level in step S34. If so, then in step S36, the controller 20 increments the clipping level of the limiter 26 by the second predetermined amount, increases the gain of the AGC 28, and resets the short and long counters. In a preferred embodiment, the gain of the AGC 28 is increased by the same second predetermined amount, but it will be appreciated from this disclosure that the present invention is not limited to adjusting the gain in this manner. After step S36, processing proceeds to step S22.

In step S34, if the current clipping level plus the second predetermined threshold is not less than the clipping maximum, then processing proceeds to step S28.

As will be appreciated from the above description, when long term interference is encountered, the clipping level is slowly increased, while for short term interference, a quick increase in the clipping level occurs. In this way, the controller 20 is responsive to and compensates for the type of interference encountered. This methodology also prevents increasing the clipping level by too great a margin such that an unnecessarily large increase in the average signal power does not occur; thus, preventing undue interference caused by the transmitted signal.

The invention being thus described, it will be obvious that the same may be varied in many ways. For example, instead of or in addition to resetting the long and short counters, the long and short counters could be decremented at, for example, step S22 or other times at the discretion of the system designer. As another alternative, the long and short counters could be kept over a moving window of time or data samples. Such variations are not to be regarded as a departure from the spirit and scope of the invention, and all such modifications are intended to be included within the scope of the following claims.

We claim:

1. A method of controlling power of a transmitted communication signal, comprising:
    amplifying a first communication signal;
    transmitting the first communication signal to a second transmission source;
    receiving a second communication signal from the second transmission source, the receiving including receiving at least one parameter derived from the transmitted first communication signal;
    determining a measure of interference with the transmitted first communication signal based on the at least one received parameter; and
    increasing an average power level of the transmitted first communication signal by clipping the first communication signal prior to amplification by an amount based on the determined measure, wherein the determining step determines if at least one of short term interference and long term interference with the transmitted first communication signal exists based on the at least one received parameter; and the increasing step increases the average power level by a first amount if the determining step determines that long term interference with the transmitted first communication signal exists and increases the average power level by a second amount if the determining step determines that short term interference with the transmitted first communication signal exists, the second amount being greater than the first amount.

2. The method of claim 1, wherein the at least one received parameter includes a signal-to-noise ratio.

3. The method of claim 1, further comprising:
calculating a signal-to-noise ratio of the transmitted first communication signal based on the at least one received parameter; and wherein
the determining step determines the measure of interference based on the calculated signal-to-noise ratio.

4. The method of claim 1, wherein the at least one received parameter includes a signal-to-noise ratio (SNR).

5. The method of claim 4, wherein the determining step includes,
first determining if the SNR is less than a first threshold, increasing a first counter if the first determining step determines the SNR is less than the first threshold,
second determining if the SNR is less than a second threshold, the second threshold being less than the first threshold,
third determining if the first counter exceeds a third threshold if the first determining step determines the SNR is less than the first threshold and the second determining step does not determine that the SNR is less than the second threshold,
increasing a second counter if the second determining step determines the SNR is less than the second threshold, and
fourth determining if the second counter exceeds a fourth threshold if the second determining step determines the SNR is less than the second threshold; and
the increasing step increases the average power level by the second amount if the third determining step determines that the first counter exceeds the third threshold and increases the average power level by the first amount if the fourth determining step determines that the second counter exceeds the fourth threshold.

6. The method of claim 1, wherein the increasing step comprises:
first clipping the first communication signal by at least the first amount if the determining step determines that long term interference with the transmitted signal exists; and
second clipping the first communication signal by at least the second amount if the determining step determines that short term interference with the transmitted signal exists.

7. The method of claim 6, wherein the determining step comprises:
first determining if a signal-to-noise ratio (SNR) is less than a first threshold;
increasing a first counter if the first determining step determines the SNR is less than the first threshold;
second determining if the SNR is less than a second threshold, the second threshold being less than the first threshold;

third determining if the first counter exceeds a third threshold if the first determining step determines the SNR is less than the first threshold and the second determining step does not determine that the SNR is less than the second threshold;
performing the second clipping step if the third determining step determines that the first counter exceeds the third threshold;
increasing a second counter if the second determining step determines the SNR is less than the second threshold;
fourth determining if the second counter exceeds a fourth threshold if the second determining step determines the SNR is less than the second threshold; and
performing the first clipping step if the fourth determining step determines that the second counter exceeds the fourth threshold.

8. The method of claim 6, wherein the increasing step further comprises:
controlling the gain of the first communication signal based on an amount by which the first communication signal is clipped.

9. The method of claim 8, wherein the at least one received parameter includes a signal-to-noise ratio (SNR).

10. The method of claim 9, wherein the determining step comprises:
first determining if the SNR is less than a first threshold;
increasing a first counter if the first determining step determines the SNR is less than the first threshold;
second determining if the SNR is less than a second threshold, the second threshold being less than the first threshold;
third determining if the first counter exceeds a third threshold if the first determining step determines the SNR is less than the first threshold and the second determining step does not determine that the SNR is less than the second threshold;
performing the second clipping step if the third determining step determines that the first counter exceeds the third threshold;
increasing a second counter if the second determining step determines the SNR is less than the second threshold;
fourth determining if the second counter exceeds a fourth threshold if the second determining step determines the SNR is less than the second threshold; and
performing the first clipping step if the fourth determining step determines that the second counter exceeds the fourth threshold.

11. The method of claim 1, wherein the determining step includes,
first determining if a signal-to-noise ratio (SNR) is less than a first threshold,
increasing a first counter if the first determining step determines the SNR is less than the first threshold,
second determining if the SNR is less than a second threshold, the second threshold being less than the first threshold,
third determining if the first counter exceeds a third threshold if the first determining step determines the SNR is less than the first threshold and the second determining step does not determine that the SNR is less than the second threshold,
performing a second clipping step if the third determining step determines that the first counter exceeds the third threshold,
increasing a second counter if the second determining step determines the SNR is less than the second threshold, and fourth determining if the second counter exceeds a fourth threshold if the second determining step determines the SNR is less than the second threshold; and the increasing step increases the average power level of the transmitted first communication signal by clipping the first communication signal prior to amplification by the first amount if the third determining step determines that the first counter exceeds the third threshold and increases the average power level of the first communication signal by clipping the first communication signal prior to amplification by the second amount, if the fourth determining step determines that the second counter exceeds the fourth threshold.

12. The method of claim 1, wherein the determining step determines if at least one of short term interference and long term interference with the transmitted signal exists based on the received parameter; and the increasing step includes, first clipping the first communication signal by at least the first amount if the determining step determines that short term interference with the transmitted signal exists; and second clipping the first communication signal by at least the second amount if the determining step determines that long term interference with the transmitted signal exists.

13. The method of claim 12, wherein the increasing step further comprises:

controlling the gain of the first communication signal based on an amount by which the first communication signal is clipped.

14. The method of claim 13, wherein the at least one received parameter includes a signal-to-noise ratio (SNR).

* * * * *